(12) United States Patent
Herren

(10) Patent No.: US 9,901,216 B2
(45) Date of Patent: Feb. 27, 2018

(54) DISK GRATER

(71) Applicant: SWIZZZCUT AG, Beckenried (CH)

(72) Inventor: Bruno Herren, Beckenried (CH)

(73) Assignee: Swizzzcut AG, Beckenried (CH)

( * ) Notice: Subject to any disclaimer, the term of this patent is extended or adjusted under 35 U.S.C. 154(b) by 373 days.

(21) Appl. No.: 14/414,381

(22) PCT Filed: Jul. 11, 2013

(86) PCT No.: PCT/EP2013/064663
§ 371 (c)(1),
(2) Date: Jan. 12, 2015

(87) PCT Pub. No.: WO2014/009459
PCT Pub. Date: Jan. 16, 2014

(65) Prior Publication Data
US 2015/0150417 A1 Jun. 4, 2015

(30) Foreign Application Priority Data
Jul. 12, 2012 (CH) ...................................... 1075/12

(51) Int. Cl.
*A47J 43/00* (2006.01)
*A47J 43/10* (2006.01)
(Continued)

(52) U.S. Cl.
CPC ........... *A47J 43/105* (2013.01); *A47J 43/082* (2013.01); *A47J 43/255* (2013.01)

(58) Field of Classification Search
CPC ....... A47J 43/105; A47J 43/082; A47J 43/255
See application file for complete search history.

(56) References Cited

U.S. PATENT DOCUMENTS

| 7,264,189 B2 | 9/2007 | Holcomb et al. |
| 2008/0164357 A1 | 7/2008 | Chau et al. |
(Continued)

FOREIGN PATENT DOCUMENTS

| CN | 1235526 A | 11/1999 |
| CN | 101478907 A | 7/2009 |
(Continued)

OTHER PUBLICATIONS

US 6,986,477, 01/2006, Holcomb et al. (withdrawn)
(Continued)

*Primary Examiner* — Faye Francis
(74) *Attorney, Agent, or Firm* — Pauley Erickson & Kottis

(57) ABSTRACT

An appliance (100) for processing foodstuffs with a drive (2) including a pull-cord roller (21) having a concentric recess (22), in which there is arranged a spring element (23) located on the inside, the spring element (23) being operatively connected to the pull-cord roller. Through the drive (2), the working unit (4), which can be made to rotate, is driven, the working unit (4) being arranged in such a way that the external toothing (62) of the drive wheel (61) engages in the internal toothing (63) of the working unit (4) and, when the drive (2) is actuated, the working unit (4) is made to rotate. A locking element (10), which is equipped to lock the drive (2) in a non-operational state, and an unlocking element (11), which is equipped to actuate the locking element (10) in order to release the locking, contribute to the high operational safety of the appliance.

25 Claims, 5 Drawing Sheets

(51) Int. Cl.
*A47J 43/08* (2006.01)
*A47J 43/25* (2006.01)

(56) References Cited

U.S. PATENT DOCUMENTS

| | | |
|---|---|---|
| 2009/0114104 A1 | 5/2009 | Sawhney et al. |
| 2009/0178580 A1 | 7/2009 | Herren |
| 2011/0226140 A1 | 9/2011 | Herren |

FOREIGN PATENT DOCUMENTS

| | | |
|---|---|---|
| DE | 20 2007 017012 U1 | 4/2008 |
| GB | 2 327 864 A | 2/1999 |
| JP | 50-11821 Y1 | 4/1975 |
| JP | 61-25726 Y2 | 8/1986 |
| JP | 62-172924 | 7/1987 |
| JP | 2009-535133 A | 1/2009 |
| WO | WO 2007/128154 A1 | 11/2007 |

OTHER PUBLICATIONS

Co-pending U.S. Appl. No. 14/414,374, Bruno Herren, Titled: Disk Grater, filed Jan. 12, 2015.
Japanese Patent Office, Notice of Reasons for Rejection, Japanese Patent Applicaiton No. P2015-520987, dated Mar. 28, 2017 (5 pages), English language version only.

DISK GRATER

BACKGROUND OF THE INVENTION

Field of the Invention

The invention relates to an appliance for processing foodstuffs.

Discussion of Related Art

The prior art discloses a multiplicity of disc graters or disc mincers which, for example, are marketed either as individual appliances or as additional appliances for kitchen machines. As a rule, such disc mincers are operated electrically. They have a filling hopper for the fruit and vegetables to be comminuted, a short tube with which the fruit and vegetables are pressed into the filling hopper and which at the same time serves as a safeguard against cutting, and an electric drive for the cutting disc. Depending on the desired cutting result, the cutting discs can be interchanged appropriately. As an example of a multiplicity of electric disc mincers, at this point the electric mincer OPTUS Z1 from the OPTUS company may be mentioned. Manually operated appliances which are of substantially identical construction to those which are electrically operated and have a crank drive are known, for example from the Zyliss company. The disadvantage with the crank drives is that the cutting disc can frequently only be driven with a low torque and, as compared with an electric drive, only substantially lower rotational speeds can be achieved. As a result, in the case of hard or fibrous material to be cut, only moderate results can be achieved. The material to be cut is either carried along by the blades of the cutting disc and not cut up, or blocking of the cutting disc occurs.

SUMMARY OF THE INVENTION

The object of the invention is therefore to provide a manually operated appliance for processing foodstuffs which does not have the aforementioned disadvantages.

According to the invention, for this purpose an appliance having an upper part, a drive and preferably a lower part with working container and a drive unit that can be driven by means of the drive and made to rotate is provided. The drive is operatively connected to the working unit. The working unit is a shaped cutting means, for example a cutting or mincing disc. Also conceivable are cutting blades for chopping or fingers for kneading.

The drive comprises a pull-cord roller having a concentric recess, in which there is arranged a spring element located on the inside, the spring element being operatively connected to the pull-cord roller. As a result of arranging the spring element in the concentric recess in the pull-cord roller, the overall height of the appliance can be reduced accordingly and thus the risk of tilting during manual activation of the pull cord can be reduced.

The spring element, preferably a spiral spring, is connected to the pull-cord roller in such a way that when the drive is actuated in a first direction of rotation, therefore when there is a pull on the pull cord, the spring element is preloaded and, after the pull cord has been released, the spring element expands again and in the process rotates the pull-cord roller in the opposite direction. In a preferred embodiment of the invention, the drive is arranged in the upper part of the appliance. The pull-cord roller, measured with respect to a central axis of the appliance, is arranged parallel to and at a distance from this central axis. The cord of the pull-cord roller is provided with a handle. The cord emerges from the upper part of the appliance, opposite a foodstuffs feed device. This exit point, depending on a geometric shape of the upper part, is preferably arranged in such a way that the distance between the central axis A of the appliance and the exit point is at a maximum. This arrangement effects the maximum transmission of force to the working unit and an improved cutting action. In a preferred embodiment, it is a manual drive.

The appliance according to the invention has a drive which, in a preferred embodiment, comprises a drive wheel with external toothing. The working unit has corresponding internal toothing. The drive wheel is arranged in relation to the working unit in such a way that the external toothing of the drive wheel engages in the internal toothing of the working unit. The drive drives the drive wheel and, as a result of the interengagement of the external toothing of the drive wheel in the internal toothing of the working unit, the working unit is made to rotate.

The drive wheel can be driven by any desired drive. In a preferred embodiment, it is a manual drive, for example a manual drive having a pull-cord roller.

The advantage with this arrangement is, for example, that the appliance manages with a reduced number of components, since the working unit is moved directly by the drive wheel.

In a preferred embodiment of the invention, the working unit is mounted such that it can be positioned on at least two bearing elements, the first bearing element being arranged in the center of the working unit, preferably in a holder provided for the purpose in the working unit.

Preferably, at least one of the two bearing elements is arranged at a distance from the first bearing element, the distance being defined by a radius of the working unit. At least one of the two bearing elements is fitted to the upper part of the appliance, preferably to the underside of the upper part. In a preferred embodiment, at least one of the two bearing elements is of hook-like design. This permits simple replacement of the working unit with simultaneously stable mounting. Particularly preferably, besides the central bearing unit, two or three peripheral, hook-like bearing elements are provided to hold the working unit securely such that it can rotate. In the case of three peripheral hook-like holding elements, these are preferably arranged at 0°, 90° and 180° positions in relation to the circumference of the working unit, for example a mincer disc. This ensures that the disc is adequately held, supported and guided and yet can still be introduced without difficulty from one side into the hook-like holding elements and, respectively, removed from the latter.

In a preferred embodiment of the invention, the working unit is a cutting, grating or mincing disc (generally designated a cutting disc below). A carrier ring which has internal toothing runs around the periphery of the cutting disc. When the working unit is driven, the drive wheel, which preferably has external toothing, engages in the internal toothing of the carrier ring and in this way drives the cutting disc. The drive force is therefore not introduced into the center of the cutting or grating disc, as known from the prior art, but transferred from the externally toothed drive wheel to the internal toothing of the cutting disc. This runs around the circumference of the cutting disc on the inner side. One advantage of this arrangement is that more space is available for arranging the foodstuffs feed device and the whole of the radius of the cutting or mincing disc can be provided for cutting. Furthermore, there is sufficient space available to provide still further wheels beside the drive wheel for an additional transmission ratio.

In a preferred embodiment of the invention, the cutting disc has a first side with a first cutting blade or cutter arrangement and a second side with a second cutting blade or cutter arrangement. The internally toothed carrier ring is arranged symmetrically in relation to the cutting disc, the cutting disc representing the plane of symmetry. The advantage with this arrangement is that two different cutting, mincing or grating products can be produced with one cutting disc. The cutting discs according to the present invention are preferably produced from steel sheet with a material thickness of 0.3 to 0.6 mm, preferably 0.4 mm.

The first and second cutter or cutting blade arrangement preferably involves, for example, a variable number of individual cutting knives, blades or cutters, preferably two to six per side, which make it possible to cut material to be cut into slices, sticks, Julienne or other shapes. It has proven to be particularly advantageous to produce the cutters directly by means of shaping from the disc material. By applying a high pressure, the cutters are punched or deep-drawn out of the disc in the desired shape and the actual cutting edge is brought to shape by material flow, so that subsequent grinding of the cutting edge is no longer necessary. The discs can consist, for example, of martensitic chrome steel sheet having a chromium content of 11.5-13.5% of the type AISI 430. The radius moulded onto the cutting edge is preferably less than 0.2 mm.

In preferred embodiments, a geometric axis of rotation of the drive wheel and a geometric axis of rotation of the working unit are arranged axially parallel to each other. The geometric axis of rotation of the drive wheel intersects the working unit. This arrangement of the drive wheel in relation to the working unit is compact, space-saving and, as a result, when installed in the upper part of the appliance, provides a high level of stylistic freedom.

In a preferred embodiment of the appliance according to the invention, a one-way clutch is also provided, which is equipped to lock in a first direction of rotation and as a result to transmit the force from the pull-cord roller or another primary driven part of the drive to the drive wheel and to set the latter rotating. In a second direction of rotation, the clutch freewheels and uncouples the drive wheel from the reverse rotational movement of the pull-cord roller or another primary driven part of the drive. The advantage with the one-way clutch is that the drive force is transmitted to the drive wheel in the desired direction of rotation and therefore the working means can be driven in the working direction. However, as the pull cord is rolled up, the latter is uncoupled from the working means and braking or jamming of the cord roller during cutting, grating or mincing of material to be cut is prevented. The one-way clutch can be connected to any kind of drive. In a preferred embodiment, it is a manual pull-cord drive.

In a preferred embodiment of the invention, the appliance for processing foodstuffs has a safety device having a locking element which is equipped to lock the working unit in a non-operational state, and an unlocking element which is equipped to actuate the locking element in order to release the locking. The locking element, preferably fitted to the upper part of the appliance, engages in a braking means, the braking means being part of the working unit. In a preferred embodiment, the working unit has toothing, preferably external toothing, and the locking element engages in this toothing.

The unlocking element is preferably a foodstuffs feed device comprising at least one hopper and a pusher, the hopper being equipped to actuate the unlocking element.

In a further preferred embodiment, the unlocking element comprises a foodstuffs feed device having a slider and a covering element operatively connected to the slider, the slider being equipped to actuate the unlocking element.

The advantage of the safety device is that the locking element locks the working unit and releases it only when the unlocking element actuates the locking element. The risk of injury to the user is reduced in this way.

The appliance according to the invention can be placed on various lower parts or detachably connected to various lower parts. In a preferred embodiment, the lower part is a collecting container. Further embodiments, such as that of a structure on which the appliance according to the invention is placed, are conceivable. The upper part can alternatively or additionally also have form-fitting means peripherally on its underside, with the aid of which it can be placed on a pot or a bowl of suitable size.

BRIEF DESCRIPTION OF THE DRAWINGS

The invention is to be explained in more detail below by using exemplary embodiments in conjunction with the drawing, in which.

DETAILED DESCRIPTION OF THE INVENTION

Figure 1:
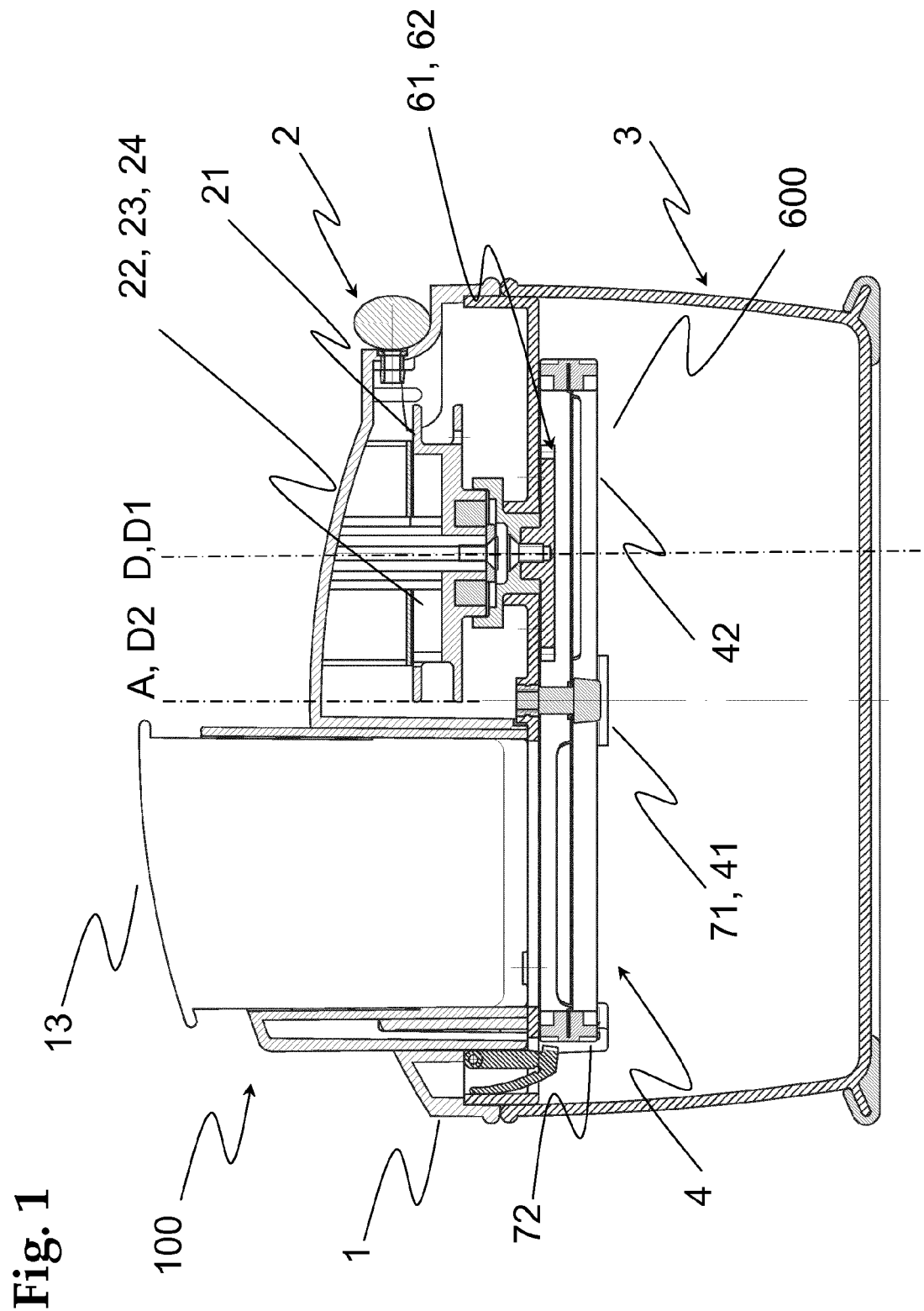
FIG. 1 shows a preferred embodiment of the appliance according to the invention in a sectional illustration.

FIG. 1 illustrates a first preferred embodiment of the appliance 100 according to the invention. The appliance comprises an upper part 1 which is placed on a lower part 3. The appliance 100 also has a working unit 4, which preferably constitutes a cutting disc 8, a foodstuffs feed unit 13 and a drive 2. In a preferred embodiment, the drive 2 comprises a pull-cord roller 21. Arranged in the pull-cord roller 21, concentrically with respect to the axis of rotation D, is a recess 22 in which there is a spring element 23, for example a spiral spring 24. The spring element 23 is operatively connected to the pull-cord roller 21 in such a way that when the drive 2 is actuated in a first direction of rotation, preferably by means of pulling manually, the spiral spring 24 is preloaded and, in a second direction of rotation, the spiral spring 24 is expanded. The preloading and expansion of the spiral spring 24 leads to the working unit 4 being made to rotate via the drive wheel 61. In this preferred embodiment, the pull-cord roller 21 is arranged in such a way with respect to the drive wheel 61 that the axis of rotation D of the pull-cord roller coincides with a geometric axis of rotation D1 of the drive wheel 61. In the preferred embodiment according to FIG. 1, the geometric axis of rotation D1 of the drive wheel 61 runs parallel to a geometric axis of rotation D2 of the working unit 4 and, respectively, a central axis A of the appliance 100.

According to the embodiment of FIG. 1, the drive wheel 61, which has external toothing 62, is operated by the drive 2. The movement of the drive wheel 61 is not restricted to that of the drive 2. A further possibility (not illustrated) is the use of a crank drive or of an electric drive. If the drive wheel 61 is made to rotate, the external toothing 62 of the drive wheel engages in internal toothing 63 of the working unit 4 and, in this way, sets the working unit 4 rotating.

The working unit 4 is preferably mounted such that it can be positioned on at least two bearing elements 71, 72. The first bearing element 71 constitutes a fixing means, for example, which is arranged in a holder 41 in the working unit 4. In a preferred embodiment of the invention, the second bearing element 72 is arranged at a distance from the first bearing element 71, the distance corresponding to the radius 42 of the working unit 4.

Figure 2:
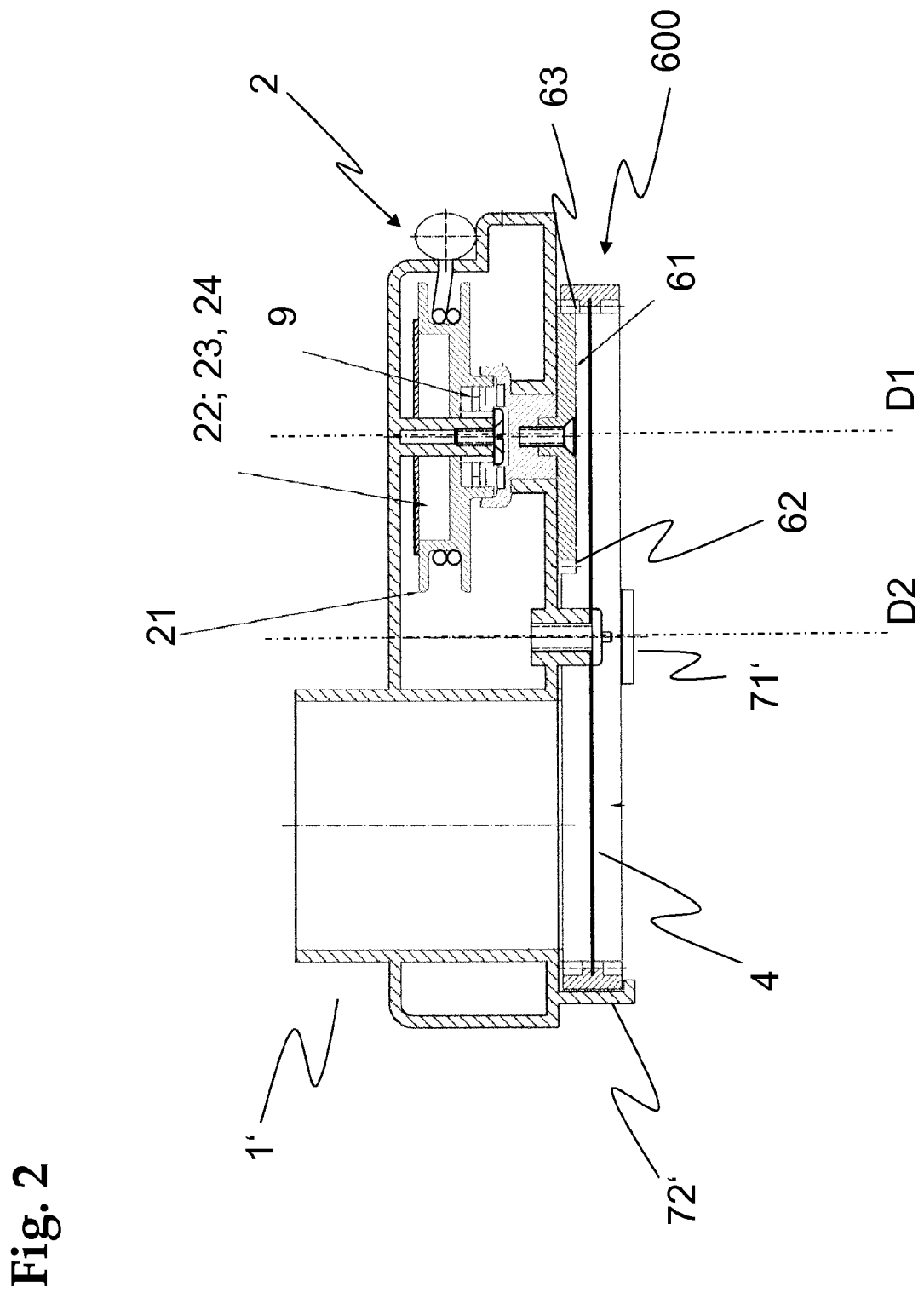
FIG. 2 shows the upper part of a preferred embodiment of the appliance according to the invention in a sectional illustration.

FIG. 2 shows a preferred embodiment of the upper part 1'. The drive 2 is connected to the drive wheel 61 via a one-way clutch 9.

Figure 3:
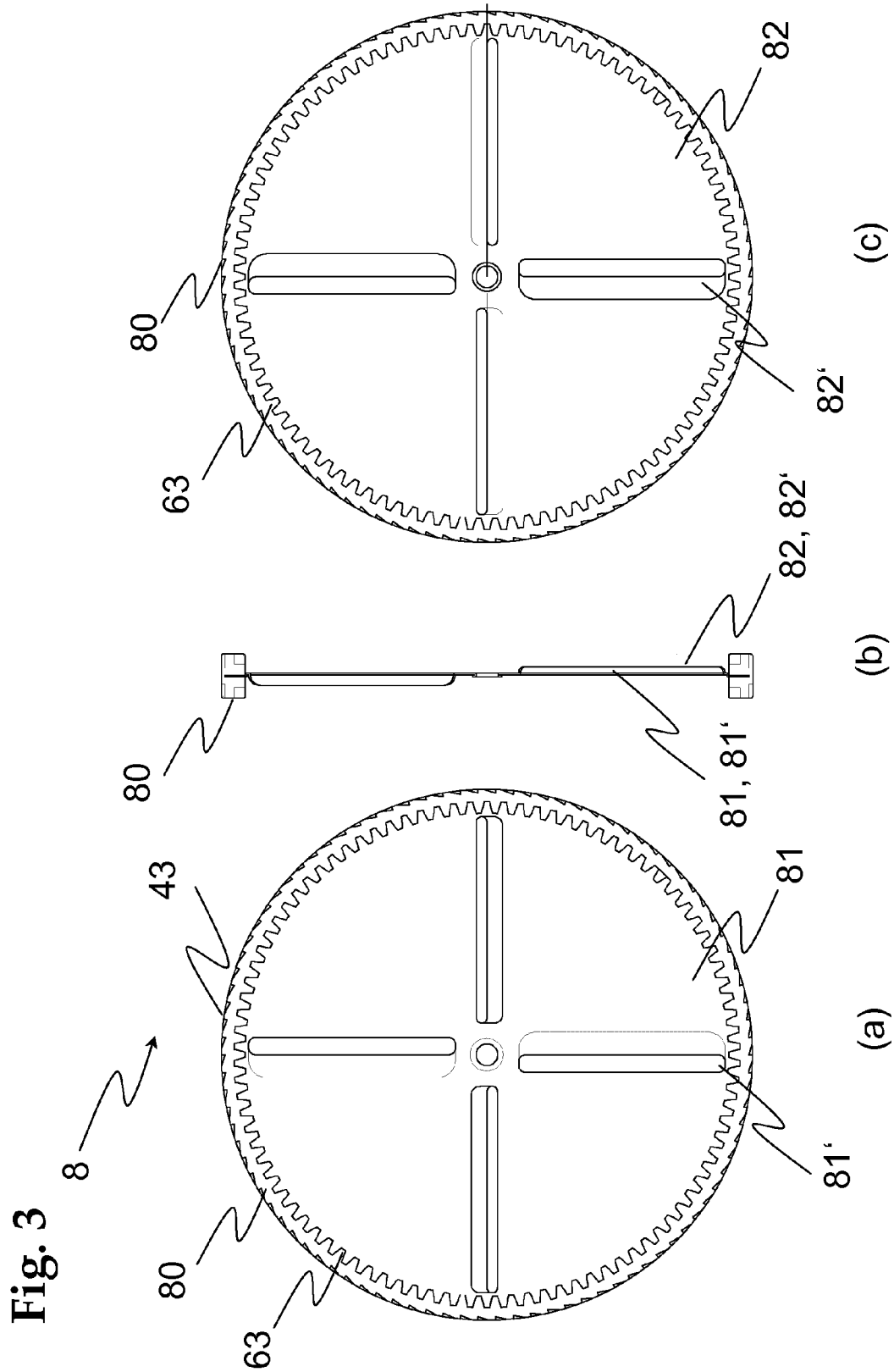
FIG. 3 shows three different views of a cutting disc (plan view (a) of a first side, (b) side view and plan view (c) of a second side)

FIG. 3(a) shows a first side 81 of a cutting disc 8 according to the invention. The cutting disc 8 constitutes a preferred embodiment of the working unit 4. On the first side 81 there is a first cutting blade arrangement 81', which is formed in such a way, for example, that fruit and vegetables can be cut into slices. In the preferred embodiment according to FIG. 3(a), a carrier ring 80, which has internal toothing 63 both on the first side 81 and on a second side 82, runs around the cutting disc (cf. also FIG. 3(b), FIG. 3(c)). In a preferred embodiment, the cutting disc 8 is fabricated from a metal sheet and the carrier ring 80 from plastic, the cutting disc 8 and the carrier ring 80 being fabricated as two separate parts. In a further embodiment, the cutting disc 8 and the carrier ring 80 are fabricated in one piece from plastic. The blades of the cutting disc are formed by separate metal inserts.

FIG. 3(b) shows a side view of the cutting disc 8. The cutting disc 8 has a first side 81 with a first cutting blade arrangement 81 and a second side 82 with a second cutting blade arrangement 82'. The carrier ring 80 is configured in such a way that the internal toothing 63 runs both on the first side 81 and on the second side 82. In a preferred embodiment, the cutting disc 8 can be used on alternate sides, depending on the cutting quality desired.

FIG. 3(c) shows a second side 82 of the cutting disc 8 with a second cutting blade arrangement 82', around which the carrier ring 80 having the internal toothing 63 runs.

The first and second cutting blade arrangement 81' and 82' shown in FIGS. 3(a) to 3(c) shows four cutting knives. The invention is not restricted to a cutting blade arrangement of four cutting knives. In further preferred embodiments, more or fewer than four cutting knives, for example three, can be provided.

Figure 4:
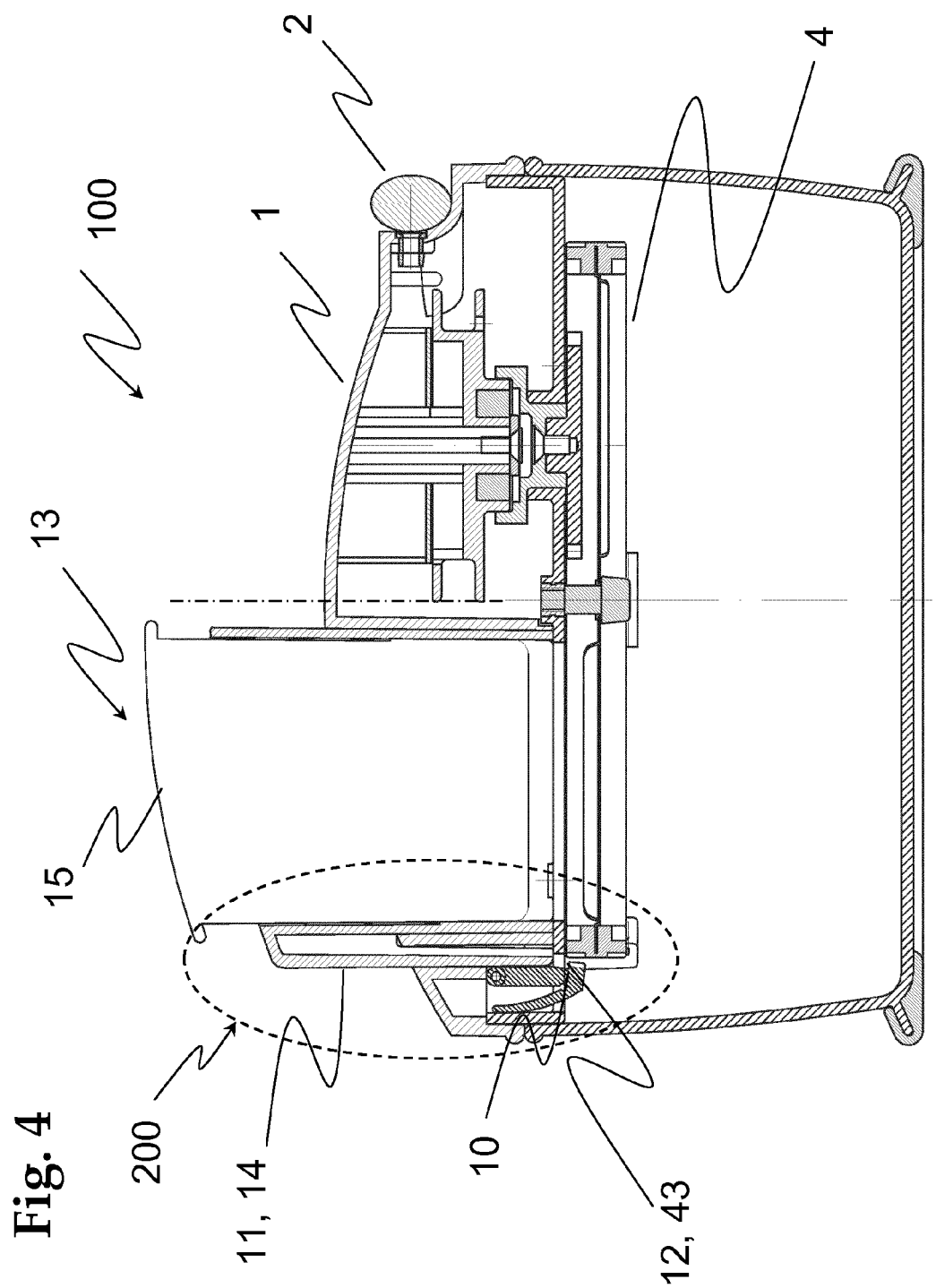
FIG. 4 shows an embodiment of the appliance having a safety device according to the invention with a preferred unlocking element.

FIG. 4 shows a preferred embodiment of a safety device 200 according to the invention. The safety device comprises an unlocking element 11 and a locking element 10. In the preferred embodiment according to FIG. 4, the locking element 10 is formed as a hook-like element mounted such that it can move and is arranged on the upper part 4 of the appliance. In the state illustrated in FIG. 4, the safety device is unlocked. The hopper 14, which is part of the foodstuffs feed device 13, constitutes the unlocking element 11. The foodstuffs feed device 13 comprises the hopper 14 and the pusher 15 and constitutes a separate unit in relation to the upper part 1. In a preferred embodiment of the invention, the foodstuffs feed device 13 can be plugged onto the upper part 1. Without the foodstuffs feed device 13 plugged on, the locking element 10 engages in the braking means 12 of the working unit 4 and locks the working unit 4. When the hopper 14 is plugged onto the upper part 1 of the appliance 100, the hopper 14 unlocks the locking element 10 and the working unit 4 can be made to rotate with the aid of the drive 2.

Figure 5:
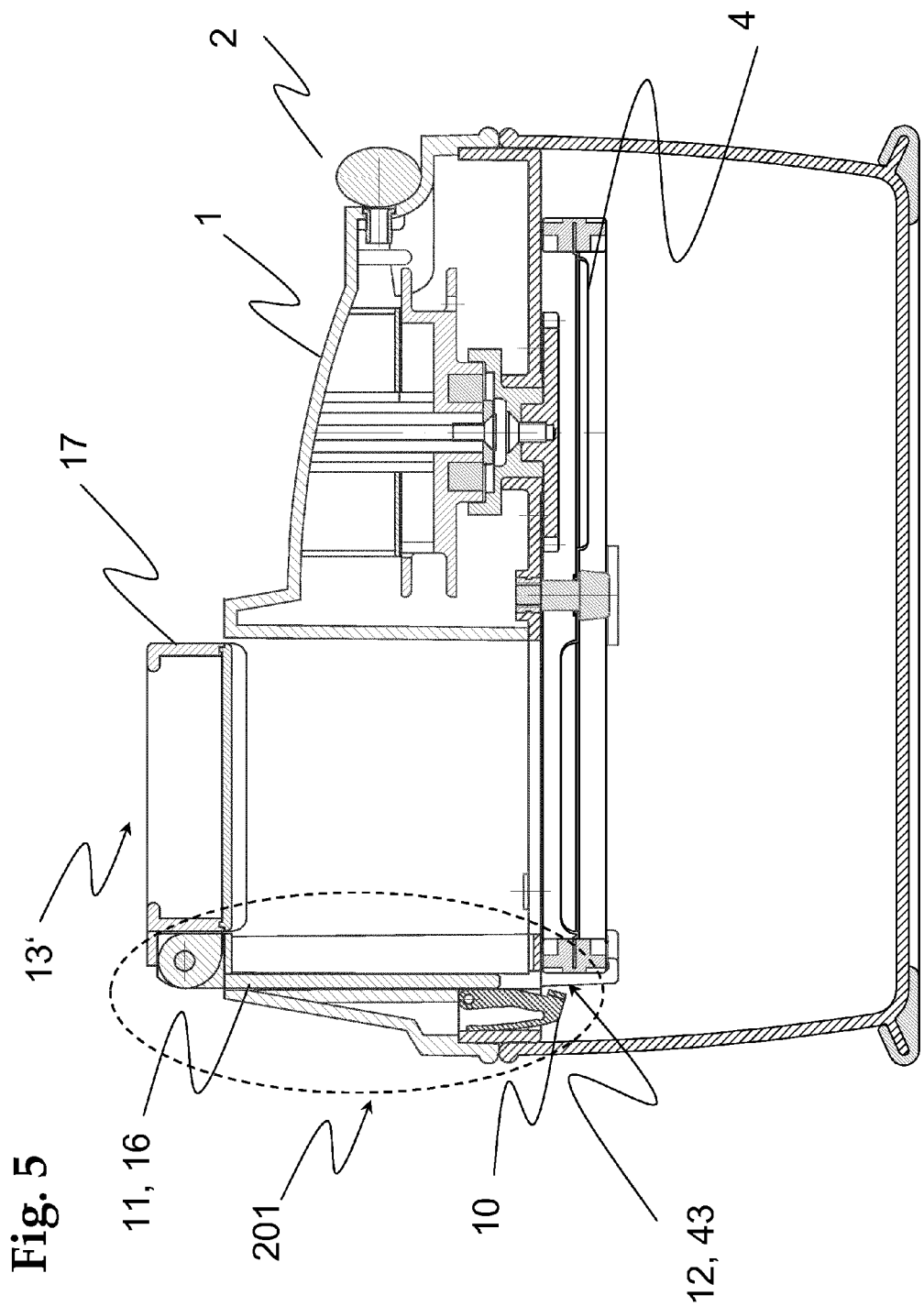
FIG. 5 shows a preferred embodiment of the cutting appliance having a further security device according to the invention with a further preferred embodiment of the unlocking element.

FIG. 5 shows a further preferred embodiment of the safety device 201 in an unlocked state. In this preferred embodiment, the foodstuffs feed device 13' comprises a slider 16 and a covering element 17. The foodstuffs feed device 13' constitutes a separate unit in relation to the upper part 1.

In a preferred embodiment of the invention, the foodstuffs feed device 13' can be plugged onto the upper part 1'. Without the foodstuffs feed device 13' plugged on, the locking element 10 engages in the braking means 12 of the working unit 4 and locks the working unit 4. When the slider 16 is plugged onto the upper part 1 of the appliance 100, the slider 16 unlocks the locking element 10 and the working unit 4 can be made to rotate with the aid of the drive 2.

The invention claimed is:

1. An appliance (100) for processing foodstuffs, having an upper part (1) and a drive (2), placed on a lower part (3), comprising a working unit (4) driven by the drive (2) and made to rotate, wherein a locking element (10) is equipped to lock the working means (4) in a non-operational state, and an unlocking element (11) is equipped to actuate the locking element (10) in order to release the locking, and wherein the unlocking element (11) comprises a foodstuffs feed device (13) comprising a hopper (14) and a pusher (15), the hopper (14) and/or the pusher (15) equipped to actuate the locking element (10).

2. The appliance (100) according to claim 1, wherein the drive (2) comprises a pull-cord roller (21) and the pull-cord roller (21) includes a concentric recess (22), in which there is arranged a spring element (23) located on the inside, the spring element (23) being operatively connected to the pull-cord roller.

3. The appliance (100) according to claim 2, wherein, in a first direction of rotation of the pull-cord roller (21), the spring element (23) is preloaded and, in a second direction of rotation, the spring element (23) is expanded and, during the preloading and expansion of the spring element (23), the working unit (4) is made to rotate.

4. The appliance (100) according to claim 2, wherein a central axis (A) of the appliance and an axis of rotation (D) of the pull-cord roller (21) are arranged parallel to each other.

5. The appliance (100) according to claim 2, wherein the spring element (23) comprises a spiral spring (24).

6. The appliance (100) according to claim 1, wherein the drive (2) is arranged in the upper part (1).

7. The appliance (100) according to claim 1, wherein the drive (2) is arranged opposite a foodstuffs feed device (13).

8. The appliance (100) according to claim 1, wherein the drive comprises a drive wheel (61) with external toothing (62) and the working unit (4) includes internal toothing (63), the drive wheel (61) being arranged in relation to the working unit (4) in such a way that the external toothing (62) of the drive wheel (61) engages in the internal toothing (63) of the working unit (4) and, when the drive (2) is actuated, the working unit (4) is made to rotate.

9. The appliance according to claim 8, wherein the working unit (4) comprises a cutting disc (8).

10. The appliance according to claim 9, wherein the cutting disc (8) includes a carrier ring (80) which runs peripherally around the cutting disc (8).

11. The appliance according to claim 10, wherein the carrier ring (80) includes the internal toothing (63).

12. The appliance according to claim 10, wherein the carrier ring (80) is arranged symmetrically in relation to the cutting disc (8), the cutting disc (8) representing the plane of symmetry.

13. The appliance according to claim 9, wherein the cutting disc (8) includes a first side (81) with a first cutting blade arrangement (81') and a second side (82) with a second cutting blade arrangement (82').

14. The appliance according to claim 8, wherein a geometric axis of rotation (D1) of the drive wheel (61) and a geometric axis of rotation of the working unit (D2) are arranged axially parallel to each other.

15. The appliance according to claim 8, wherein the geometric axis of rotation (D1) of the drive wheel intersects the working unit (4).

16. The appliance according to claim 8, wherein a one-way clutch (9) is equipped to set the drive wheel (61) rotating in a first direction of rotation and, in a second direction of rotation, the drive wheel (61) freewheels.

17. The appliance according to claim 1, wherein the working unit (4) is mounted such that it is positioned on at least two bearing elements (71; 72).

18. The appliance according to claim 17, wherein the first bearing element (71) is arranged in the center of the working unit (4), in a holder (41) provided for the purpose in the working unit (4).

19. The appliance according to claim 17, wherein the at least second bearing element (72) is arranged at a distance from the first bearing element (71), the distance being defined by a radius (42) of the working unit (4).

20. The appliance according to claim 17, wherein the at least second bearing element (72) is arranged on an underside (11) of the upper part (1).

21. The appliance according to claim 17, wherein the at least one of the two bearing elements (71, 72) is of hook-like design.

22. The appliance according to claim 1, wherein the locking element (10) engages in a braking means (12), the braking means (12) being part of the working unit (4).

23. The appliance according to claim 22, wherein the braking means (12) is formed as toothing (43), and the locking element (10) engages in this toothing (43).

24. The appliance according to claim 1, wherein the locking element (10) is formed as a hook-like element mounted such that it can move.

25. An appliance (100) for processing foodstuffs, having an upper part (1) and a drive (2), placed on a lower part (3), comprising a working unit (4) driven by the drive (2) and made to rotate, wherein a locking element (10) is equipped to lock the working means (4) in a non-operational state, and an unlocking element (11) is equipped to actuate the locking element (10) in order to release the locking, wherein the unlocking element (11) comprises a foodstuffs feed device (13) comprising a slider (16) and a covering element (17) operatively connected to the slider (16), the slider (16) equipped to actuate the locking element (11).

* * * * *